April 7, 1970 S. P. BIRKELAND 3,505,654

METHOD FOR RETRIEVING PRERECORDED INFORMATION FROM A RECORDING MEDIUM WITH AN UNMODULATED ELECTRON BEAM

Filed Oct. 27, 1964

LEGEND: FIG. 6

INVENTOR.
STEPHEN P. BIRKELAND
BY
Carpenter, Abbott, Coulter & Kinney
ATTORNEYS

United States Patent Office 3,505,654

Patented Apr. 7, 1970

3,505,654

METHOD FOR RETRIEVING PRERECORDED INFORMATION FROM A RECORDING MEDIUM WITH AN UNMODULATED ELECTRON BEAM

Stephen P. Birkeland, White Bear Lake, Minn., assignor to Minnesota Mining and Manufacturing Company, St. Paul, Minn., a corporation of Delaware Filed Oct. 27, 1964, Ser. No. 406,765

Int. Cl. G11b *1/00*

U.S. Cl. 340—173 4 Claims

ABSTRACT OF THE DISCLOSURE

A method for retrieving prerecorded information from a sheet-like photon-energy emissive electron excitable recording medium is shown wherein the method comprises the steps of functionally positioning a means for detecting photon energy adjacent one face of the recording medium and simultaneously directing an unmodulated beam of electrons having a diameter approximately equal to the average lineal distance of an individual information bit to be retrieved from the medium against the opposed face of the medium and wherein said beam has sufficient energy to produce differential photon emission from the one face thereof.

This invention relates to a new and improved method for retrieving information from a pre-recorded storage medium capable of differentially emitting photon energy from one face thereof, in response to uniform electron excitation of one face thereof, such differential photon emission being systematically representative of the pre-recorded information to be retrieved.

Those skilled in the art have known how to record information upon a sheet-like storage medium and thereafter read such inforfmation out by means of electron beam excitation to produce photon emission from the medium. The principle is that one affects during the recording process the initial ability of a uniformly photon emissive material to so emit photons so that such surface of the medium thereafter becomes differentially photon emissive in a manner uniquely representative of information recorded therein.

Heretofore, however, so far as I am aware, it was necessary to excite the pre-recorded medium with electrons from the same side of the medium wherein the information was recorded initially. I have now discovered that by an appropriately constructed medium one can by striking the reverse or backside of a recording medium with excited electrons produce differential photon emission from the front side or side bearing recorded information. The result is that I am able not only to lengthen the useful life of a recording medium since a high energy electron beam is not directly striking the portion of the medium bearing recorded information but also, one can avoid the physical problems of equipment arrangement which result from trying to place photon sensing devices on the same side of the medium as that on which it is necessary to cause an electron beam to impact in order to produce the desired differential photon emission for readout from such medium.

It is therefore among the objects of the present invention to provide a method for retrieving pre-recorded information from a sheet-like differentially photon emissive recording medium.

It is another object of this invention to provide a method for retrieving information from one face of a recording medium by exciting the reverse face of such medium uniformly with an electron beam.

Other and further objects of this invention will become apparent to those skilled in the art from a reading of the present specification taken together with the drawings wherein:

FIGURE 6 is a legend which identifies the various layers illustrated in FIGURES 1–5.

Figure 1:
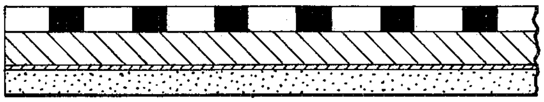
FIGURE 1 is an artist's diagrammatic presentation of a cross-sectional view of one embodiment of a recording medium useful in this invention.

For purposes of clarity it is deemed advisable to define certain terms as used in this application as follows:

By the term "photon energy" as used in this application reference is had to radiant energy ranging from ultraviolet radiation up through infra-red radiation thus including the visible light spectrum (i.e., energy having wavelengths of from about 400 to 700 millimicrons) associated with an excited fluorescent material.

By the term "actinic radiation" as used in this application reference is had not only to photon energy as hereinbefore defined but to all electromagnetic radiation and also to ionizing radiation (including particulate energy such as alpha particles, protons, electrons, neutrons, nucleides, and other subatomic particles).

By the term "dwell time" as used in this application reference is had to the average time in seconds the spot diameter formed by a moving electron beam spends in an area equal to its own.

By the term "imaging material" as used in this application reference is had to a material which is capable of developing therein, following exposure to differential actinic radiation a generally planar spatial distribution of photon absorptive regions corresponding to, or representative of energy variations in radiation to which given imaging material is exposed.

By the term "fluorescent material" as used in this application reference is had to a photon-emitting, actinic radiation excitable material.

By the term "real time readout" as used in this application reference is had to the fact that information can be retrieved from a recording medium substantially immediately after a recording (storing) operation without the need for any intervening processing.

By the term "spacer layer" as used in this application reference is had to a transparent layer of solid material such as a backing member or the like interposed between the layer of fluorescent material and the layer of imaging material.

By the term "luminescent foci" as used in this application reference is had to the individual centers of actinic radiation generated photon energy emission in a prerecorded medium construction being read out in accordance with the teachings of this invention. The size and character of such individual centers is dependent not only upon materials of construction used in a medium but also upon the nature of the incident actinic radiation used for photon energy generation. In general the average size of such centers is equal to or smaller than the size of the smallest individual information bit to be retrieved.

The term "information" as used in this application is defined as a differentially photon energy absorptive pattern on a recording medium.

In general, media useful in practicing the methods of this invention comprise:

(a) A fluorescent material layer which is uniformly emissive of characteristic photon energy when uniformly excited by actinic radiation, and (b) A plurality of deposits of substantially non-fluorescent material (relative to the fluorescent material) adjacent one face of said medium each individual deposit being adapted to absorb at least a portion of the photon energy emitted by the fluorescent material, preferably more than 10%. This plurality of deposits constitutes a layer of imaging material.

The fluorescent material layer and the deposits of substantially non-fluorescent material can be combined with one another or they can be present in a medium construction as separate layers either adjacent one another or spaced from one another by an intervening layer or layers provided said layers are at least 10% transmissive of the characteristic photon energy emitted by the fluorescent material.

As those skilled in the art will appreciate, fluorescent compositions are generally very well known. These materials each have associated with them a characteristic persistence time by which is meant the period of time following removal of excitation required for the photon emission to decay to approximately 1% of its value at the time of cessation of excitation. For example, the P–1 phosphor (the zinc silicate type) has a persistence of .05 second, while the P–15 phosphor (zinc oxide type) has a persistence of one microsecond. Organic fluorescent compositions dissolved in appropriate polymer binders (generally referred to as scintillators) have persistence times commonly as low as $10^{-8}$ second; for example, that of p-terphenyl is about $10^{-8}$ second. In general, luminescence persistence values for conventional fluorescent compositions fall in the range of from about .05 second to times of the order of $10^{-9}$ second. For best results, the luminescence persistence of a fluorescent layer should have approximately not greater than the same time duration as the dwell time of the read out electron beam.

The photon emission capability of a fluorescent composition used in a medium of this invention should be sufficient to provide a satisfactory signal-to-noise ratio when such emission is to be converted to electrical form during readout by some type of photoelectric device. When conventional optical methods are to be used for readout, a greater level of photon emission is desired for a given level of electron excitation. In general, I find that output requirements under either electrical or optical readout conditions are met when the fluorescent layer is excited by electron beams having current densities not greater than about 100 amps per square centimeter.

In general, the selection of a particular fluorescent composition is determined by the use to which the medium is to be put. In addition, it may be desirable to use a given medium construction for purposes other than electronic readout, such as in a conventional type optical projection system. For such use, the fluorescent composition in a medium construction should be essentially photon transparent, for direct projection and ease of visual inspection of pre-recorded information. In this situation, it is convenient ot employ organic scintillators as the fluorescent composition.

It is preferred to use fluorescent compositions having physical properties that will enable one to anchor or adhere same to associated components in a medium construction of the invention. It is also preferred to use fluorescent materials which can be used under high vacuum conditions without affecting their fluorescent properties and to use materials capable of being handled and stored without deterioration or other undesirable deleterious side affects.

Since the preparation of fluorescent compositions is well known and does not constitute a part of the present invention, discussion of their preparation and properties is not deemed necessary and desirable herein.

In general, to form a plurality of deposits of substantially non-fluorescent material, as those skilled in the art will appreciate, one can employ substances which form such deposits upon exposure to actinic radiation so that the chemical nature of such deposits depends upon the nature of the starting substances. One such material comprises photographic silver halide emulsions. Such emulsions (after exposure to actinic radiation) and following development display silver deposits in direct proportion to the intensity of impinging radiation. Other substances include materials which develop such deposits immediately after radiation exposure. In addition to the foregoing, suitable masking materials include thermographic systems (which darken upon heating), photoinitiated dehydrohalogenation systems (which darken on heating), diazonium salt-coupler systems (developed by treatment with ammonia vapor or other alkaline substances) and other chemical and physical systems which exhibit selective transparentization and photon-masking in response to differential irradiation. Since such materials are well known, no detailed description of them is given herein.

In addition to deposits of substantially non-fluorescent material and fluorescent material, media useful in the processes of this invention can contain conductive materials, backing materials and such miscellaneous materials as subbing layers and the like as those killed in the art will appreciate. It will be understood, however, that the thickness and composition of a medium construction must be so chosen as to be consistent with the energy level of the electron energy to be used in reading out pre-recorded information from such a medium in accordance with the teachings of this invention.

In general, one uses a medium which has information previously stored or previously recorded therein. Information can be stored by any conventional process. Storing can involve the use of optical techniques, electron beam scanning techniques, exposure to various forms of non-visible actinic radiation or the like. Since recording does not constitute a part of this invention, it is not described in detail herein.

Similarly following the recording operation it is sometimes necessary to develop the masking layer in a medium construction in order to produce the desired mask. Since development procedures are not a part of this application they will not be explained in detail herein, but development may involve physical or chemical treatment in accordance with the present invention.

Thus, after storage and development (if desirable or necessary) a storage medium is placed in a vacuum and the surface thereof opposite to that from which differential photon emission is to be obtained is exposed to electrons (e.g. an unmodulated scanning electron beam such as those generated by an electron gun).

When a medium bearing stored information is subsequently excited with an unmodulated electron beam, the fluorescent material is caused to emit photon energy. As this photon energy passes through the photon masking layer, there results a difference in energy emission from the storage medium surface between the differentially masked and unmasked areas. This difference in photon energy emission is detected visually, photo-electronically, by a second photon-sensitive storage medium, or by some other form of photon energy detector. Photon energy detectors are well known and include such devices as the eye, cameras, photocells, and the like.

Thus, when such storage medium bearing stored information is subsequently irradiated with energized electrons, as, for example, by an unmodulated electron beam and the medium is excited to fluoresce a differentially photon-emissive pattern results from the surface of the medium. Electron beams can be conveniently employed to flood the surface of a storage medium with energized electrons.

Usually it is desirable to employ an electron optical system with an electron gun to produce electron beams for retrieval in accordance with this invention. Any conventional electron optical system equipped for producing the desired concentration of accelerated electrons over the specified retrieval area can be utilized. In certain instances the accelerated electrons may be focused into a small beam which can be scanned over a target field used for readout in accordance with the teachings of this invention. The beam generated is not modulated. Retrieval (readout) is often conveniently achieved merely by a visual inspection of the recorded surface. Sometimes a conventional optical system is desirable in order to magnify the photon-emissive surface of a pre-recorded medium by a readout with a scanning unmodulated electron beam.

Readout may be accomplished at a faster rate than the initial recording. The quality of the readout depends upon the optical density existing between the imaged areas and background areas in the masking layer, but the rapidity at which one can readout recorded information depends mainly upon the decay time of the photon-emissive material and upon the response time of the sensing device (e.g. a photomultiplier). Therefore, for example, an image that is recorded at, say, a 5 megacycle rate can be read out up at say a 50 megacycle rate.

Because the absorption of light is non-destructive to the material which absorbs it, there is no destruction of the image by the readout method. Those skilled in the art will appreciate that in prior art methods of electronic readout of some differentially photon-emissive media commonly there has been an occasionally observed tendency for the exciting actinic radiation to degrade the masking or imaging layer. However in the present invention, since the beam voltage can be readily adjusted so that it does not penetrate completely through the fluorescent layer, or, if it does, it is not allowed to penetrate completely through the spacing layer, the masking layer is not touched by the electron beam after it has once been recorded. This tends to prevent degrading the imaging layer. Thus readout by the present invention is nondestructive of the recorded medium.

The thickness of a spacer layer if used does not affect the quality of the light emitted, provided the spacer layer does not absorb the wave lengths emitted by the fluorescent material. It does, however, affect the resolution which may be attained. The distance between the fluorescent layer and the masking layer is specified in Formula 1, and the spacer layer is taken into account. However, the spacer layer cannot be so large that the maximum useful separation between luminescent foci and the masking layer is exceeded. It is preferred to incorporate the fluorescent layer into the spacer layer to conserve the amount of information one can store per roll, since by removing the spacer layer, one automatically reduces the size of a construction and therefore allows more information to be stored per roll. Furthermore, by removing the spacer layer one brings the source of light closer to the masking layer, and greater resolution is attainable; that is, according to the Formula 1 below, the foci cannot be further removed from the opaque deposits than a certain maximum distance; and depending upon the bit size of the recorded areas, the foci must be moved closer to the masking area to achieve increased resolution. For example, ten micron bits may be read out easily using a spacer layer of ½ mil.

When reading out information bits from a storage medium in accordance with this invention, it is desirable to carry out the whole process while maintaining a vacuum of the order of from about $10^{-3}$ to $10^{-5}$ millimeter of mercury in the region of the electron beam (and usually the hardware used to generate and control same) and the medium.

The optical sensing device if used to detect the differences in photon emission from the medium is also conveniently placed in vacuum—at least the detecting head of such device. It will be appreciated, however, that any manipulation of such photon emission after detection thereof as with a lens, photomultiplier or the like can readily be accomplished outside of vacuum.

In the present invention one should use a storage medium in which the photon emission from the fluorescent material or photon emitting material has a characteristic wave length such that the masking material selectively absorbs such radiation. Furthermore, it is desirable that the optical sensing device be sensitive to the characteristic photon emission associated with such fluorescent material. In a most preferred embodiment of the present invention the fluorescent material emits a characteristic photon output in response to electron beam excitation which output has a wavelength range of maximum intensity approximating the spectral energy response associated with the photon sensing device. Likewise the masking areas or deposits in the storage medium absorb those frequencies which correspond to the characteristic photon emission of such fluorescent material.

While the method of this invention in its broadest aspect involves functionally positioning a means for detecting photon energy adjacent adjacent that face of a pre-recorded medium which when electron beam excited, differentially emits photon energy, and simultaneously directing an unmodulated electron beam of electrons against the opposite face of said medium so as to produce differential photon emission from said one face, nevertheless, it will be appreciated that in a preferred embodiment of the present invention one uses an electron beam having certain characteristics. Thus, the energy associated with said beam is sufficient to maintain an average distance between luminescent foci within the medium being read out and information on the other surface thereof of normally superior thereto not greater than the approximate value of K in Formula 1 below:

$$K = 7B \times \frac{s}{\sqrt{A}} \qquad (1)$$

where $s$ is the minimum width of any element of the pattern to be retrieved from a medium. A is the cross-sectional area of the photon sensing portion of the means employed for collecting photon energy emission positioned parallel to said medium, and B is the shortest distance between said photon sensing portion and the nearest face of said medium. In the preferred case the numerical value of 7 is reduced to 3.5.

For example, utilizing the above relationship of Formula 1 a recording whose minimum spacing is approximately 14 microns is read out using a photomultiplier tube with a circular photon sensing portion of about 1 inch radius positioned about 4 inches away from the surface of the medium which differentially emits photon energy when actinically irradiated. In such a situation the spacing layer can be as thick as about 5 to 8 mils without loss in resolution. In the preferred case, a spacing layer of about 0.5 to 1 mil is utilized.

Preferable in practicing the present invention the distance between a photoelectric device such as a photomultiplier from the surface of the storage medium which emits photon energy differentially is at least 100 times the average distance between individual information bits.

Turning to the figures, there is seen in FIGURE 1 one type of medium construction suitable for use in this invention. Here a discrete fluorescent layer is separated by a plastic film which serves as a spacer element from a masking layer.

Figure 2:
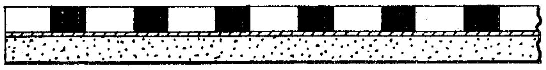
FIGURE 2 is a view similar to FIGURE 1 but showing an alternative embodiment of a medium construction.
Figure 3:
FIGURE 3 is a view similar to FIGURE 1 but showing another alternative embodiment of a medium construction.

FIGURE 2 illustrates another type of medium construction. Here no spacer layer is employed between the fluorescent layer and the masking layer. However, a partially transparent vapor coated metallic (e.g. aluminum) conductive layer is placed between the fluorescent layer and the masking layer. A similiar construction is shown in FIGURE 3 where such a vapor coating is placed on an outside face of the medium adjacent the fluorescent layer so that light (e.g. photon emission) generated in the fluorescent layer is not attenuated before passing through the masking layer and reaching a sensing device such as a phototube. In either position the conductive layer can act as a reflector and increase the amount of generated light which passes through a masking layer.

Using the construction of FIGURES 2 and 3, by passing an electron beam through the masking layer before it strikes the fluorescent layer and positioning the phototube superior to the fluorescent layer one can get no readout. This is because the light generated in the fluorescent layer reaches the phototube directly without being attenuated. If these media constructions are turned over and one allows excited electrons to come into the fluorescent layer before passing through the masking layer (thereby allowing the light generated to be differentially attenuated by the masking layer before it reaches the phototube), one gets a differential photon emission at a sensing device such as a phototube, the amount and type of photon emission depending upon the attenuation of the masking layer to the wavelengths generated in the fluorescent layer. If one has a vapor coat between the fluorescent layer and the masking layer one cuts down this light by the factor of the transparency of the conductive coating, e.g. if it is a 50% transparent layer, one cuts the average photon energy approximately in half. It appears that the preferred location for the vapor coat is on that face of the fluorescent layer which is most remote from the photon sensing means.

Figure 4:
FIGURE 4 is a view similar to FIGURE 1 but showing still another alternative embodiment of a medium construction.

FIGURE 4 shows a medium construction in which the fluorescent layer is distributed throughout the medium construction with the masking portions thereof passing transversely completely through the medium. This medium is completely symmetrical, except for the photon transmissive conductive layer which may be on either face. For purposes of this invention, if one side is metal vapor coated as by vacuum deposition, it is possible to allow the actinic irradiation to strike through the vapor coat before causing fluorescence and to position the phototube on the opposite side of the vapor coat. It is also possible to turn the medium over and let the electrons strike directly into the medium without passing through the vapor coat and then allowing the generated light to exit through the vapor coated side. It is preferred to allow an electron beam to pass through the vapor coat, generate light and then allow the light to strike the sensing device placed on the side opposite to the entry of the electron beam. Thus light is reflected towards the sensing device by the vapor coat, in addition to the light that passes directly out through the mask.

Figure 5:
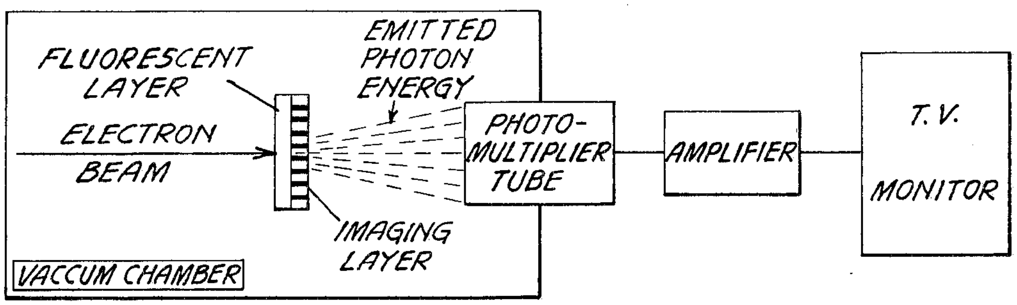
FIGURE 5 is a schematic diagram of the manner in which the process of the present invention is practiced.
Figure 5:
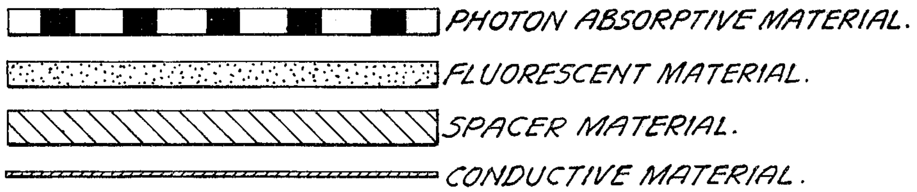

Turning to FIGURE 5, there is seen a schematic diagram in which a medium construction comprising a fluorescent layer and an imaging layer is aligned with respect to the axis of an electron beam. The sensing head portion of a photomultiplier is likewise aligned with the same beam axis. The photomultiplier is preferably placed at a distance from the surface of the medium which is large in comparison to the distance between information bits to be retrieved from said medium, in accordance with Formula 1 above. Output from the photomultiplier tube is fed to an amplifier and then to a television type monitor equipped for visual display.

The duration of the photon emission generated within the medium by the incident electrons is dependent among other things upon the dwell time of the electron beam. The information bit that is to be retrieved from a storage medium must be translated into information modulated photon energy during the time that the electron beam remains in the vicinity of the point where that bit is stored in such medium. In general, only photon energy which passes normally out of such medium can reach the optical sensing device, here the photomultiplier, because any photon emission that leaves the surface of a medium at an appreciable angle will not strike the collection area of the sensing head portion of the photomultiplier. Thus, any generated photon energy which passes through or around other masking deposits than those which are to be used for generating the information bit to be read out during the dwell time of the electron beam leaves the medium surface at too large an angle with respect to the electron beam axis and does not strike the sensing head portion of the photomultiplier. It is only at some subsequent time that light generated underneath such other masking deposits can be recognized or observed by the sensing head portion of the photomultiplier.

As will be appreciated from FIGURE 5, it is preferred in practicing the invention to use media constructions employing separate layers, respectively, for the photon emissive or fluorescent material and for the masking deposits or imaging material. Separate layers allow one to pack in effect a large amount of fluorescent material in a small localized area and also to know exactly where the imaging material is. The result is that one can control electron beam energy characteristics so that there is no chance (as in the case of a still sensitive imaging material in a prerecorded medium to be read out) for the energized electrons in the beam to strike through the fluorescent material and further image the imaging or masking layer during readout.

It will be further appreciated from FIGURE 5 that for some situations it is advantageous not to have any spacer layer positioned between the fluorescent layer and the imaging or masking layer as when high density information storage and retrieval are the desired goals. In this situation the spacer layer is preferably removed and the fluorescent layer can serve both as a supporting layer and as the fluorescent material in a medium construction. In this situation, for example, the supporting layer can be an organic film such as polyethylene terephthalate having dissolved therein a scintillator material such as dimethylamino chalcone p-terphenyl, perylene, or the like.

It will be appreciated from FIGURE 5 that the amount of light required by the photomultiplier or other sensing device, for readout purposes, is dependent upon the bandwidth of information to be retrieved.

From the foregoing description of FIGURE 5 it will be appreciated that the medium construction used for readout in accordance with the teachings of this invention need not be a monolithic integral type construction. Thus, for example, referring to FIGURE 3 it will be seen that the imaging layer can be deposited over a fluorescent layer immediately before or at the time of readout operation by suitably positioning appropriate fluorescent and imaging layers in intimate contact. Commonly plastic films exhibit sufficient electrostatic attraction one to the other to effect a suitable adherence of adjacent layers one to the other.

As a practical matter which those skilled in the art will readily comprehend, there are three parameters associated with the recording medium which affect the read out: fluorescence decay time, fluorescence conversion factor, and the contrast of the non-fluorescent material or masking deposits relative to background areas. "Fluorescence decay time" is similar to phosphor persistence, and is the time necessary for a steady state fluorescence photon energy output to decrease to about 37% of its steady state value after removal of the excitation energy. "Fluorescence conversion factor" is the percent conversion of input actinic energy into output photon energy. The contrast of the non-fluorescent masking deposits refers to the ability of the non-fluorescent material to absorb photon energy in a detectably distinct manner relative to the background areas.

In general, a faithful electronic readout of the recorded image requires the fluorescence decay time of the fluorescent material to be less than the dwell time of the readout electron beam, i.e., the ratio decay time/dwell time is less than about 1.0. For instance, electronic readout of a single track recording 10 microns ($\mu$) wide and 0.5 centimeter long at a 1 megacycle/second rate with an electron beam having a 10μ diameter spot size is equivalent to readout with a dwell time of about $5\times10^{-7}$ seconds. Likewise a $10^{-7}$ second dwell time is equivalent to a 5 megacycle/second readout. Thus, for a fluorescent material to be useful for readout at a 1 megacycle/second rate, its fluorescence decay time must be less than $5\times10^{-7}$ second; and less than $10^{-7}$ second to be useful for readout at a 5 megacycle/second rate. Fluorescent organic materials in general and organic scintillators in particular have decay times of less than $10^{-8}$ second, and represent a particularly useful class of fluorescent materials.

Readout quality is mainly dependent upon the fluorescence conversion factor. Since the light collection and amplification circuitry used for readout have an intrinsic background noise, sufficient light must be collected to allow operation at levels well above noise. A high conversion factor guarantees that this level will be reached. Theoretically, when reading out at high frequencies (i.e. 1.0–5 mc.) approximately $10^{-7}$ watt of photon power arriving at the phototube is sufficient to allow a signal output at least 10 times greater than the background noise. Since $10^{-3}$ watt of power is the maximum amount which may be delivered by an electron beam of 10μ spot size, and $10^{-7}$ second dwell time to the fluorescent layer without significant radiation damage, a conversion efficiency of $10^{-7}/10^{-3}=10^{-4}$ would be required if all the photon power generated in the fluorescent layer arrived at the phototube. In actual practice about 1% of the generated light is collected by the phototube and conversion factors of greater than $10^{-2}$ are required. The organic scintillators are a preferred class of materials since they have conversion factors greater than $10^{-2}$.

In an optimum medium construction for use in practicing the process of the present invention, it is advisable to have the fluorescent layer in a medium construction be as thin as practicable, consistent with the amount of light that must be generated for readout, and yet have such layer thick enough to utilize as high a possible percentage of the incident electron energy and convert same into a photon emission output. Indeed the thickness of the masking or imaging layer does not appear to be as significant a factor as the thickness of the fluorescent or photon-emissive electron beam-excitable layer, and, if present, the spacing layer interposed between such fluorescent layer and such imaging layer. In general, however, the masking layer's thickness should be comparable to the thickness of the fluorescent layer. Furthermore, the masking layer thickness should not exceed by more than a factor of about 2 or 3 the distance across an information bit to be retrieved, in accordance with the present invention.

In practicing the invention, it is preferred to maintain the diameter of the electron beam used for photon emission generation in about the same diameter range as the distance across an individual information bit. Such a preference is, of course, satisfied when the same electron beam is used both to record information and then read same out from the given medium. However, if a medium is recorded in one apparatus using a particular beam and then another apparatus is used for readout, for best results in practicing the present invention care must be taken to make sure that the read out electron beam does not have a diameter very much larger than the distance across an individual bit.

In practicing the present invention it has been found best to use media which are suitable for the generation of point sources of light or foci so as to generate as much photon energy from as small an area of fluorescent material as possible. This objective is generally approached as the readout beam diameter is decreased relative to the diameter of the recording beam.

The invention is further illustrated by reference to the following examples.

EXAMPLE 1

FIGURE 1 shows one type of medium construction that may be read out backside. The fluorescent layer composed of 4-dimethylamino chalcone dissolved in polymethylmetacrylate, is coated onto a .2 mil polyester film. The polyester film bears a 50% optically transmissive aluminum vapor coat and it is over such coating that the potential masking layer, a pale yellow colored vinylidene chloride n-butylacrylate copolymer containing 10% by weight of 4-phenylazodiphenyl amine dye, is coated.

The medium construction may be placed into a vacuum chamber and scanned with an electron beam to record an image thereon. The recording is made using a 10 micron beam spot, 20 kilovolts accelerating potential, $10^{-7}$ second dwell time and 10 microamps of beam current. In 1/60 of a second, 262 scan lines are traced out upon an approximately 3/8 inch square raster. The optical density produced in the imaged areas is roughly .78 optical density units. The image is grain-free and appears deep red in color and has its maximum absorption at approximately 5500 A. The unimaged areas are yellow. The medium is taken out of the vacuum, turned over and placed back into vacuum. It is now scanned with an unmodulated beam using a 12–15 kv. accelerating potential 10μ beam spot, $10^{-7}$ second dwell time and 1/10 microamp beam current. The beam strikes the fluorescent layer of dimethylamino chalcone and produces yellow photon emission which is passed through the spacer layer and then through the masking layer. In the red areas of the masking layer the light is attenuated to produce differential photon emission. This emission is sensed by a photomultiplier and displayed on a television monitor. There is displayed an excellent contrast image. The scan lines of the raster are clearly evident and good contrast between the scan lines and background are observed with characteristic sharp edges and no blurring. Image quality does not decay after 20,000 readouts, indicating the fluorescent material is not being significantly degraded by the beam. Note that much less energy is utilized for readout than for recording.

Instead of using an electron beam to record the masking layer, UV light may be used. Thus, for example, a 40 micron mesh screen is layed down on the masking layer and a contact print made using a 4 watt germicidal lamp with its output at 2537 A. in the ultraviolet. Approximately 10 second exposure gives a mask having the necessary .5 optical density unit change. The image is the mask. It is composed of dark red lines on a yellow background, each line being spaced approximately 80 microns from the adjacent parallel line measured center to center. When the resulting medium is read out as above described, equivalent results are obtained.

EXAMPLE 2

A medium construction similar to that shown in FIGURE 4 but having a transparent backing member in place of the conductive material can be read out in accordance with the teachings of the present invention. Here the medium construction is a conventional silver halide emulsion upon a methyl cellulose backing. This film is exposed to visible light and a normal photographic image bar pattern is recorded thereon. Thereafter, the film is developed conventionally except that into the developing tank is introduced 10% by weight of sodium fluorescein. As a result this fluorescent dye is incorporated into the gelatine as well as the acetate film backing. After fixing and a minimum amount of washing, the now developed negative is dried and the fluorescent sodium fluorescein is trapped in the gelatine emulsion.

Next, the so-developed film is placed into a vacuum chamber and scanned with a 20 kv., one microamp electron beam having a spot diameter of about 10 microns in a television raster pattern. The film is positioned so that the beam strikes the emulsion coated side of the negative.

Light is generated differentially and is allowed to strike a photomultiplier tube positioned at a distance of about 5 inches from the side opposite the emulsion coated surface of the film. Output of the photomultiplier is fed to a television monitor upon which the initial image bar pattern is clearly reproduced.

In place of sodium fluorescein one can employ Blancophor FFG, a trademark of the General Aniline Co., or Calcofluor-white 5BT, a trademark of the American Cyanamid Co. and obtain generally equivalent results.

EXAMPLE 3

This example employs a medium construction such as that shown in FIGURE 2. The fluorescent backing is formed by dissolving p-terphenyl in polyethylene terephthalate and then extruding this polymer into a film about 5 mils in thickness. Upon one surface of the film a grease pencil is used to mark over a vacuum vapor deposited 50% light transmissive coating of aluminum vapor.

The medium is placed into a vacuum chamber so that the polyethylene terephthalate side faces the electron source and the side bearing the grease pencil marks faces the photomultiplier sensing head positioned approximately 4 inches away. This construction is exposed to a scanning electron beam, having a 20 kv. acceleration potential, $10\mu$ beam spot, a $10^{-7}$ second dwell time and a $\frac{1}{10}$ $\mu$amp beam current. The differential light signal picked up by the photomultiplier is fed to an amplifier and displayed on a television monitor. The grease pencil marks are faithfully reproduced, with sharp edges, and excellent contrast. The readout may be repeated several thousand times, i.e. at least 20 seconds of continuous readout, without observable decrease in the quality of the picture displayed on the monitor.

EXAMPLE 4

This example employs a medium construction such as that shown in FIGURE 2. The fluorescent layer is prepared as follows. The dry ingredients 2% by weight of 4-dimethylamino chalcone and 98% by weight of polyethylene terephthalate were blended for two hours, heated at about 200° C., and this melt dropped onto a casting roller and extruded as a film 0.25 mil thick. Next an aluminum vapor coat 60% transparent to light was applied on one surface of the polyethylene terephthalate film followed by a potential masking layer of diazonium material having a dry thickness of 0.2 mil, prepared by coating from a solution made up of 1.1 grams citric acid, 0.5 gram thiourea, 0.3 gram 3,5-resorcylic acid amide, 0.15 gram p-diethylamino-benzene-diazonium hexafluorophosphate, 2.2 grams polyvinyl acetate, 2.2 grams cellulose acetate and 40 grams acetone.

This medium construction is placed into a vacuum chamber and the photon absorptive deposits (masking areas) are created by electron impingement onto the diazonium layer from a scanning electron beam having a $10\mu$ spot diameter, 5 $\mu$amp beam current, $10^{-5}$ second dwell time and 20 kv. acceleration potential, followed by exposure outside of vacuum to ammonia vapors. Substantially instantly a red image corresponding to the raster created by the electron beam appears in the non-electron beam struck areas.

For electronic readout, the imaged medium is placed in vacuum with the polyethylene terephthalate fluorescent layer facing the electron source and an RCA 8054 photomultiplier tube positioned in vacuum 2 inches from the medium, on a line coaxial with the electron source but on the opposite side of the medium with respect to said source.

The fluorescent layer is irradiated with a television type raster created by a scanning electron beam defined by the following parameters. A $10\mu$ beam diameter, 0.1 $\mu$amp beam current, $10^{-7}$ second dwell time and 20 k.v. acceleration potential. The differential light signal reaching the phototube is amplified and displayed on a television monitor.

The display is a faithful reproduction of the scan line pattern. These lines are plainly evident with sharp edges and excellent contrast. Readout may be continued for many seconds without a noticeable decrease in image quality.

Having described my invention, I claim:

1. A method for retrieving pre-recorded information from a sheet-like photon-energy emissive, electron excitable recording medium, said medium having a fluorescent material layer and further having adjacent one face thereof a separate masking layer having information elements pre-recorded thereon, said one face of said medium, when the opposed face thereof is struck by actinic radiation, thereby being differentially emissive of photon energy which is systematically representative of said pre-recorded information, said method comprising the steps of:

(a) functionally positioning a means for detecting photon energy adjacent said one face thereof, and (b) simultaneously directing an unmodulated beam of electrons having a diameter approximately equal to the average lineal distance of an individual information bit to be retrieved from said medium against the opposed face of said medium, said beam having sufficient energy to produce differential photon emission from said one face.

2. A method for retrieving a plurality of pre-recorded information bits from a sheet-like recording medium having opposed, generally parallel faces said medium having a fluorescent material layer and a separate masking layer having information bits pre-recorded thereon, said medium being so constructed that, when struck by excited electrons of predetermined energy, one face thereof differentially emits photon energy, the lineal distances measured across said one face between successive changes of predetermined magnitude in the photon energy emission pattern being systematically representative of information elements to be retrieved, said method comprising the steps of:

(a) functionally positioning the head portion of a means for detecting photon energy over but substantially parallel to said one face, and (b) simultaneously directing an unmodulated beam of electrons against a face of said medium in the region from which a differential photon energy emission is desired from said one face, the energy associated with said beam being sufficient to maintain an average distance between luminescent foci within said medium and points on said one surface thereof normally superior thereto not greater than the approximate value of the relationship $$7B\times\frac{s}{\sqrt{A}}$$

where $s$ is the minimum width of an information element of said pattern, A is the cross-sectional area of said head portion, and B is the shortest distance between said head portion and said one face.

3. A method for retrieving a plurality of pre-recorded information elements from a sheet-like recording medium having opposed, generally paralled faces, said medium being so constructed that, when first portions of the other face of said medium are struck by excited electrons of predetermined energy, second portions of said one face thereof located opposite the so-struck first portions differentially emit photon energy, the lineal distances measured across said one face thereof between successive changes of predetermined magnitude in photon energy emission being systematically representative of individual information elements to be retrieved, said method comprising the steps of:

(a) functionally positioning the head portion of a means for detecting photon energy adjacent those said second portions of said one face from which pre-recorded information elements are to be retrieved, and (b) simultaneously directing an unmodulated beam of electrons against that first portion of said other face of said medium opposite that second portion of said one face of said medium from which a differential photon emission is desired, said beam having a diameter approximately equal to the average lineal distance of an individual information element to be retrieved from said medium and having sufficient energy to produce differential photon emission from said one face and to maintain an average distance between luminescent foci within said medium and said one face thereof normally superior thereto not greater than the approximate value of the relationship $$7B \times \frac{s}{\sqrt{A}}$$

where $s$ is the minimum width of an information element, A is the cross-sectional area of said head portion, and B is the shortest distance between said head portion and said one face.

4. The method of claim 3 wherein the said head portion of said means for detecting photon energy is maintained at a distance from said one face of at least about 100 times the average distance between individual information elements to be retrieved.

References Cited

UNITED STATES PATENTS

| | | | |
|---|---|---|---|
| 2,798,185 | 7/1957 | Hansen | 340—173 |
| 3,317,713 | 5/1967 | Wallace | 340—173 |
| 3,328,775 | 6/1967 | Duwe | 340—173 |
| 3,403,387 | 9/1968 | Boblett | 340—173 |

TERRELL W. FEARS, Primary Examiner

U.S. Cl. X.R.

315—8.5